(12) United States Patent
Yamane et al.

(10) Patent No.: US 11,053,410 B2
(45) Date of Patent: Jul. 6, 2021

(54) FLUOROCHEMICAL COATING COMPOSITION AND ARTICLE TREATED THEREWITH

(71) Applicant: Shin-Etsu Chemical Co., Ltd., Tokyo (JP)

(72) Inventors: Yuji Yamane, Annaka (JP); Shinichi Sato, Annaka (JP); Noriyuki Koike, Annaka (JP); Takashi Matsuda, Annaka (JP); Ryusuke Sakoh, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 657 days.

(21) Appl. No.: 14/661,256

(22) Filed: Mar. 18, 2015

(65) Prior Publication Data

US 2015/0275035 A1 Oct. 1, 2015

(30) Foreign Application Priority Data

Mar. 31, 2014 (JP) .............................. JP2014-074293

(51) Int. Cl.
| | | |
|---|---|---|
| C09D 171/00 | (2006.01) | |
| C08G 65/336 | (2006.01) | |
| C08G 65/00 | (2006.01) | |
| C09D 171/02 | (2006.01) | |
| C03C 17/30 | (2006.01) | |
| C09D 5/00 | (2006.01) | |
| C09D 183/12 | (2006.01) | |
| C08G 77/46 | (2006.01) | |

(52) U.S. Cl.
CPC ............ *C09D 171/00* (2013.01); *C03C 17/30* (2013.01); *C08G 65/007* (2013.01); *C08G 65/336* (2013.01); *C09D 5/006* (2013.01); *C09D 171/02* (2013.01); *C03C 2217/29* (2013.01); *C03C 2217/76* (2013.01); *C08G 77/46* (2013.01); *C08L 2205/02* (2013.01); *C09D 183/12* (2013.01); *Y10T 428/31612* (2015.04); *Y10T 428/31663* (2015.04)

(58) Field of Classification Search
None
See application file for complete search history.

(56) References Cited

U.S. PATENT DOCUMENTS

| 7,196,212 B2 | 3/2007 | Yamaguchi et al. |
| 2008/0050600 A1* | 2/2008 | Fan ........................ C07F 7/1836 |
| | | 428/447 |
| 2013/0004780 A1* | 1/2013 | Hervieu ................. C09D 5/006 |
| | | 428/447 |
| 2013/0136928 A1† | 5/2013 | Yamane |
| 2014/0287240 A1† | 9/2014 | Murotani |

FOREIGN PATENT DOCUMENTS

| EP | 2 641 944 A2 | 9/2013 |
| JP | 2003-238577 | 8/2003 |
| JP | 2012-157856 A | 8/2012 |
| JP | 2013-136833 | 7/2013 |
| WO | 2013/074299 A1 † | 5/2013 |
| WO | WO 2013/121986 A1 | 8/2013 |

OTHER PUBLICATIONS

Office Action dated Mar. 18, 2016 in European Patent Application No. 15159563.4.
Office Action dated Oct. 10, 2017 in Japanese Patent Application No. 2015-045455.
Oerlikon, leybold vacuum, "E and Dk Rotary Piston Vacuum Pumps," excerpt from the Oerlikon Leybold Vacuum Full Line Catalog, Product Section C06, 2010.†
Ideal Vacuum Products, "RUVAC Roots Vacuum Pumps," excerpt from the Leybold Vacuum Full Line Catalog, Product Section C07, 2006.†
International Application No. PCT/US2012/063182 filed Nov. 2, 2012, in the USPTO, titled "Fluorinated Coatings With Lubricious Additive," and published as WO 2013/074299 dated May 23, 2013.†

\* cited by examiner
† cited by third party

*Primary Examiner* — Alicia Chevalier
*Assistant Examiner* — Elaine M Vazquez
(74) *Attorney, Agent, or Firm* — Oblon, McClelland, Maier & Neustadt, L.L.P.

(57) ABSTRACT

A fluorochemical coating composition is provided comprising (A) a hydrolyzable group-containing silane modified with a fluorooxyalkylene-containing polymer and (B) a fluorooxyalkylene-containing polymer having an average molecular weight not higher than the average molecular weight of component (A) in a weight ratio (A)/(B) of 40/60 to 95/5. The composition forms on a substrate a water/oil repellent layer which does not detract from the visibility of the substrate.

15 Claims, No Drawings

FLUOROCHEMICAL COATING COMPOSITION AND ARTICLE TREATED THEREWITH

CROSS-REFERENCE TO RELATED APPLICATION

This non-provisional application claims priority under 35 U.S.C. § 119(a) on Patent Application No. 2014-074293 filed in Japan on Mar. 31, 2014, the entire contents of which are hereby incorporated by reference.

TECHNICAL FIELD

This invention relates to a coating composition comprising a fluorooxyalkylene-containing polymer-modified silane and an article treated therewith. More particularly, it relates to a fluorochemical coating composition comprising a fluorooxyalkylene-containing polymer-modified silane and/or a partial hydrolytic condensate thereof, and a fluorooxyalkylene-containing polymer having a lower average molecular weight, the composition forming a coating having water/oil repellency and low dynamic friction, and an article treated therewith.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an increasing need for technology to attain fingerprint proofness or easy stain removal on a surface of a display for better appearance or visibility. Prior art water/oil repellent agents can form films having the advantages of high water/oil repellency and easy stain wipe-off. It is attempted to add a nonfunctional oil to such treating agents for improving durability and sliding properties. However, since the nonfunctional oil is less compatible with the treating agents, haze often becomes a problem. It is thus desired to develop a treating agent and method capable of forming a high-performance film in a consistent manner while suppressing any haze increase.

Generally, fluorooxyalkylene-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically alkoxysilyl) in the molecule. The alkoxysilyl groups undergo hydrolysis in the presence of airborne moisture or the like. As the alkoxysilyl groups form chemical and physical bonds with the surface of glass or metal, the coating becomes a tough coating having durability.

As an example of the fluorooxyalkylene group terminated with an alkoxysilyl group, Patent Document 1 discloses a fluorooxyalkylene group-containing silane represented by the formula shown below.

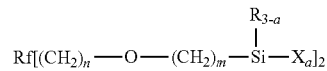

Herein Rf is a divalent linear fluorooxyalkylene group, R is $C_1$-$C_4$ alkyl or phenyl, X is a hydrolyzable group, n is an integer of 0 to 2, m is an integer of 1 to 5, and a is 2 or 3. When treated with this fluorooxyalkylene group-containing silane, glass, antireflective coatings and other substrates are improved in stain wipe-off. However, since the terminal groups are bound to the substrate, surface lubricity is insufficient and therefore, sliding properties and flaw resistance are insufficient.

Patent Document 2 proposes a blend of a fluorooxyalkylene-containing silane with a nonfunctional fluorooxyalkylene-containing polymer having a higher average molecular weight. When the blend is applied by vacuum evaporation, the coating is controlled to a surface roughness of the order of several nanometers. This proposal is effective for the vacuum evaporation method of depositing from components with relatively low molecular weights. When the blend is coated by spraying or dipping, the compatibility between the fluorooxyalkylene-containing silane and the nonfunctional fluorooxyalkylene-containing polymer becomes a problem, leading to a haze increase.

CITATION LIST

Patent Document 1: JP-A 2003-238577
Patent Document 2: JP-A 2013-136833

DISCLOSURE OF INVENTION

An object of the invention is to provide a fluorochemical coating composition capable of consistently forming on a substrate a water/oil repellent film which does not detract from the visibility of the substrate, and an article treated with the coating composition.

As mentioned above, the inventors previously proposed in Patent Document 2 a coating composition adapted for evaporation comprising a hydrolyzable group-containing silane modified with a fluorooxyalkylene-containing polymer and a nonfunctional fluorooxyalkylene-containing polymer having a higher molecular weight. Since a low-boiling component is preferentially evaporated in the evaporation process, a layer rich in the fluorooxyalkylene-containing polymer-modified silane is formed on the substrate side, and a layer of the nonfunctional fluorooxyalkylene-containing polymer having a higher molecular weight is formed on the surface side. Even if agglomeration occurs in the fluorooxyalkylene-containing polymer layer, the outermost layer of the nonfunctional fluorooxyalkylene-containing polymer buries irregularities, preventing a haze increase. However, when the composition is diluted with a fluorochemical solvent and spray coated, the coating exhibits an increased haze. It is demonstrated that the degree of haze increase varies with a particular coating technique.

The inventors have discovered that the problem of haze increase is solved by adding a nonfunctional fluorooxyalkylene-containing polymer having a lower average molecular weight to a fluorochemical coating composition comprising a polymer having a fluorooxyalkylene structure backbone and terminated with a hydrolyzable group. When the resulting composition is coated onto a substrate, a water/oil repellent layer having improved sliding and abrasion resistant properties is formed without increasing haze.

Accordingly, in one aspect, the invention provides a fluorochemical coating composition comprising (A) a hydrolyzable group-containing silane modified with a fluorooxyalkylene-containing polymer and/or a partial hydrolytic condensate thereof, and (B) a fluorooxyalkylene-containing polymer having an average molecular weight not higher than the average molecular weight of component (A), in a weight ratio (A)/(B) of 40/60 to 95/5.

In a preferred embodiment, component (A) contains 10 to 200 repeating units of the general formula (1):

  (1)

wherein g is independently in each unit an integer of 1 to 6, as the fluorooxyalkylene group, and has at least one hydrolyzable silyl group of the general formula (2):

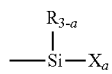  (2)

wherein R is $C_1$-$C_4$ alkyl or phenyl, X is a hydrolyzable group, and a is 2 or 3, at one or more ends, and component (B) contains 10 to 100 repeating units of the general formula (1) as the fluorooxyalkylene portion.

In a preferred embodiment, the hydrolyzable group-containing silane modified with a fluorooxyalkylene-containing polymer (A) is at least one member selected from fluorooxyalkylene-containing polymer-modified silanes having the general formulae (3), (4), (6) and (7).

A-Rf-QZW$_\alpha$  (3)

Rf-(QZW$_\alpha$)$_2$  (4)

Herein Rf is —(CF$_2$)$_d$—(OCF$_2$)$_p$(OCF$_2$CF$_2$)$_q$(OCF$_2$CF$_2$CF$_2$)$_r$—(OCF$_2$CF$_2$CF$_2$CF$_2$)$_s$(OCF(CF$_3$)CF$_2$)$_t$—O—(CF$_2$)$_d$—, d is independently an integer of 0 to 5, p, q, r, s and t are each independently an integer of 0 to 200, p+q+r+s+t is an integer of 10 to 200, individual units in parentheses may be randomly arranged; α is an integer of 1 to 7; A is fluorine, hydrogen, or a monovalent fluorinated group terminated with —CF$_3$, —CF$_2$H or —CH$_2$F radical; Q is a single bond or an optionally fluorinated divalent organic group; Z is a single bond, a trivalent group: -JC= (wherein J is an alkyl, hydroxyl or silyl ether group: K$_3$SiO— wherein K is independently hydrogen, alkyl, aryl or alkoxy), a trivalent group: -LSi= (wherein L is alkyl), a tetravalent group: —C≡, a tetravalent group: —Si≡, or a di- to octavalent siloxane residue; W is a hydrolyzable group-bearing group having the general formula (5a), (5b), (5c) or (5d):

  (5a)

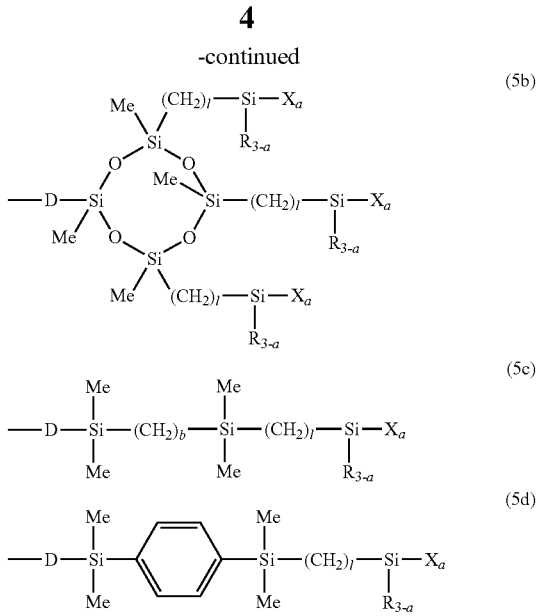

wherein R is $C_1$-$C_4$ alkyl or phenyl, X is a hydrolyzable group, a is 2 or 3, l is an integer of 0 to 10, D is a single bond or an optionally fluorinated $C_1$-$C_{20}$ divalent organic group, b is an integer of 2 to 6, and Me is methyl.

A-Rf-Q-(Y)$_\beta$  (6)

Rf-(Q-(Y)$_\beta$B)$_2$  (7)

Herein Rf, A and Q are as defined above; p is an integer of 1 to 10; Y is a hydrolyzable group-bearing divalent group having formula (5a); and B is hydrogen, $C_1$-$C_4$ alkyl or halogen.

In a preferred embodiment, Y is a group having the general formula (8), (9) or (10).

  (8)

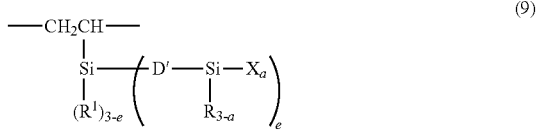  (9)

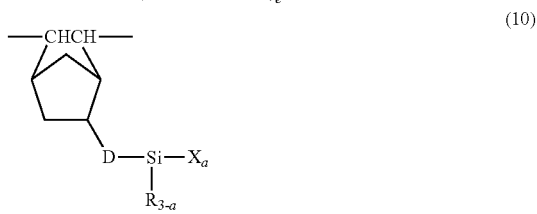  (10)

Herein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, and e is 1 or 2.

In a preferred embodiment, component (B) is a polymer having the general formula (11).

A-Rf-A  (11)

Herein Rf is $-(CF_2)_d-(OCF_2)_p(OCF_2CF_2)_q$ $(OCF_2CF_2CF_2)_r-(OCF_2CF_2CF_2CF_2)_s(OCF(CF_3)CF_2)_t-$ $O-(CF_2)_d-$, d is independently an integer of 0 to 5, p, q, r, s and t are each independently an integer of 0 to 100, p+q+r+s+t is an integer of 5 to 100, individual units in parentheses may be randomly arranged, and A is fluorine, hydrogen, or a monovalent fluorinated group terminated with $-CF_3$, $-CF_2H$ or $-CH_2F$ radical.

In a preferred embodiment, Q is a single bond or a group selected from divalent groups having the following formulae.

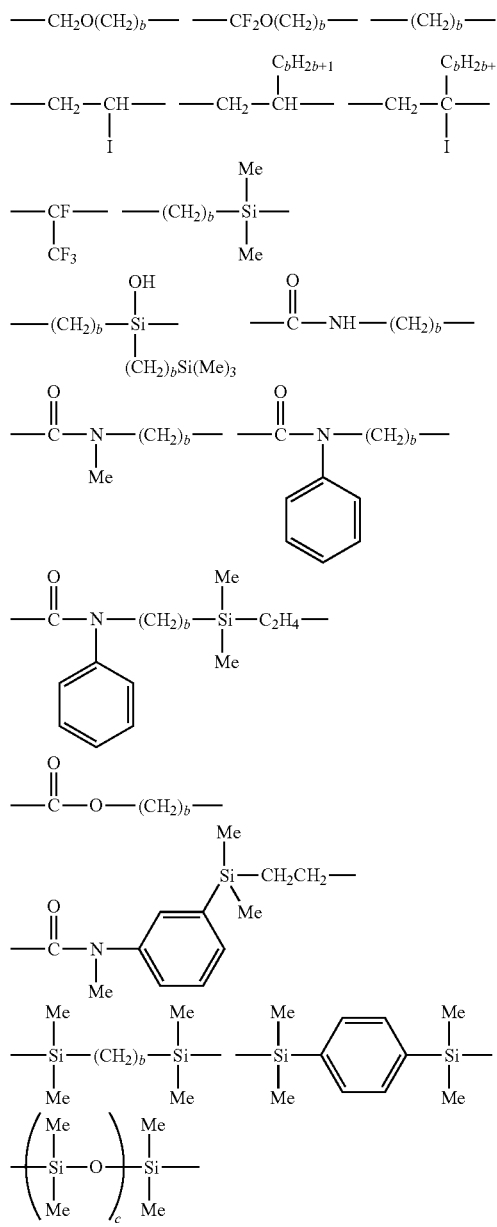

Herein b is an integer of 2 to 6, c is an integer of 1 to 50, and Me is methyl.

In a preferred embodiment, Z is a single bond or a group selected from divalent to octavalent groups having the following formulae.

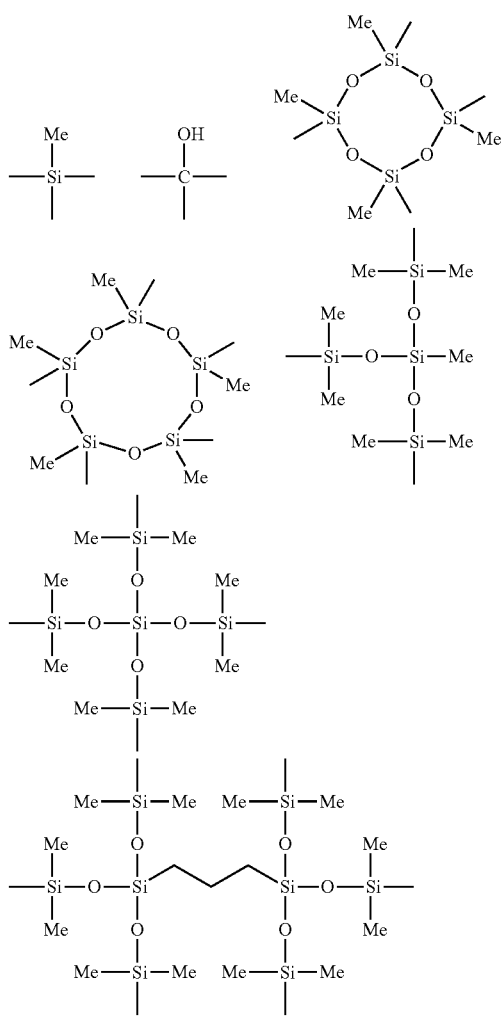

The fluorochemical coating composition may further comprise a solvent for dilution, typically ethyl perfluorobutyl ether, decafluoropentane, pentafluorobutane or perfluorohexane.

Also contemplated herein is an article treated with the fluorochemical coating composition defined above. Preferred embodiments include a touch panel, antireflective coated article, glass, strengthened glass, sapphire glass, quartz glass, and $SiO_2$-deposited substrate, which have been treated with the fluorochemical coating composition.

Advantageous Effects of Invention

When the fluorochemical coating composition comprising (A) a hydrolyzable group-containing silane modified with a fluorooxyalkylene-containing polymer and/or a partial hydrolytic condensate thereof, and (B) a fluorooxyalkylene-containing polymer having an average molecular weight lower than the average molecular weight of component (A) is wet coated onto a substrate, the resulting coating presents a water/oil repellent surface with low haze. On wet treatment of various articles with the fluorochemical coating composition, the articles are endowed with excellent antifouling performance at low haze.

DESCRIPTION OF PREFERRED EMBODIMENTS

The notation (Cn-Cm) means a group containing from n to m carbon atoms per group. Me stands for methyl, and Mw is a weight average molecular weight.

One embodiment of the invention is a fluorochemical coating composition comprising (A) a hydrolyzable group-containing silane modified with a fluorooxyalkylene-containing polymer and/or a partial hydrolytic condensate thereof, and (B) a fluorooxyalkylene-containing polymer having an average molecular weight not higher than the average molecular weight of component (A). Components (A) and (B) are present in a weight ratio of 40/60 to 95/5.

When the fluorochemical coating composition comprising components (A) and (B) is applied to a glass substrate or $SiO_2$-deposited substrate (i.e., substrate having $SiO_2$ deposited thereon by evaporation or sputtering) by spraying, inkjet coating, spin coating, dipping or vacuum evaporation, the treated substrate or antifouling article has the advantages of improved sliding and flaw resistant properties and minimum haze increase, over the antifouling article which is coated solely with component (A).

In one embodiment, component (A) is a hydrolyzable group-containing silane modified with a fluorooxyalkylene-containing polymer, specifically a silane containing 10 to 200, preferably 20 to 100 repeating units of the general formula (1):

  (1)

wherein g is independently in each unit an integer of 1 to 6, as the fluorooxyalkylene group, and having at least one hydrolyzable silyl group of the general formula (2):

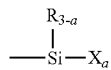  (2)

wherein R is $C_1$-$C_4$ alkyl or phenyl, X is a hydrolyzable group, and a is 2 or 3, at one or more ends, preferably at one end.

Further, component (A) has at least one hydrolyzable group-containing silyl group of formula (2), preferably 1 to 12 hydrolyzable silyl groups, and desirably a plurality of hydrolyzable groups X, preferably 2 to 36, more preferably 2 to 18 hydrolyzable groups.

Examples of the repeating unit of formula (1), which is the fluorooxyalkylene group, are shown below. It is understood that the fluorooxyalkylene group may be composed of repeating units of one type or combination of two or more types, while individual repeating units may be randomly arranged.

—$CF_2O$—
—$CF_2CF_2O$—
—$CF_2CF_2CF_2O$—
—$CF(CF_3)CF_2O$—
—$CF_2CF_2CF_2CF_2O$—
—$CF_2CF_2CF_2CF_2CF_2CF_2O$—
—$C(CF_3)_2O$—

In formula (2), R is a $C_1$-$C_4$ alkyl group such as methyl, ethyl, propyl or butyl, or a phenyl group.

X is a hydrolyzable group. There are contained a plurality of hydrolyzable groups, preferably 2 to 36, and more preferably 2 to 18 hydrolyzable groups. Suitable hydrolyzable groups include $C_1$-$C_{10}$ alkoxy groups such as methoxy, ethoxy, propoxy and butoxy, $C_2$-$C_{10}$ alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo. It is acceptable that hydrogen on the hydrolyzable group is substituted by halogen. Inter alia, methoxy, ethoxy, isopropenoxy and chloro are preferred.

Preferably, the hydrolyzable group-containing silane modified with a fluorooxyalkylene-containing polymer as component (A) is at least one member selected from fluorooxyalkylene group-containing polymer-modified silanes having the general formulae (3), (4), (6), and (7).

  (3)

  (4)

Herein Rf is —$(CF_2)_d$—$(OCF_2)_p(OCF_2CF_2)_q$ $(OCF_2CF_2CF_2)_r$—$(OCF_2CF_2CF_2CF_2)_s(OCF(CF_3)CF_2)_t$—$O$—$(CF_2)_d$—, d is independently an integer of 0 to 5, p, q, r, s and t are each independently an integer of 0 to 200, p+q+r+s+t is an integer of 10 to 200, individual units in parentheses may be randomly arranged. The letter α is an integer of 1 to 7. "A" is fluorine, hydrogen, or a monovalent fluorinated group terminated with —$CF_3$, —$CF_2H$ or —$CH_2F$ radical. Q is a single bond or an optionally fluorinated divalent organic group. Z is a single bond, a trivalent group: -JC= (wherein J is an alkyl, hydroxyl or silyl ether group: $K_3SiO$— wherein K is independently hydrogen, alkyl, aryl or alkoxy), a trivalent group: -LSi= (wherein L is alkyl), a tetravalent group: —C≡, a tetravalent group: —Si≡, or a di- to octavalent siloxane residue. W is a hydrolyzable group-bearing group having the general formula (5a), (5b), (5c) or (5d).

  (5a)

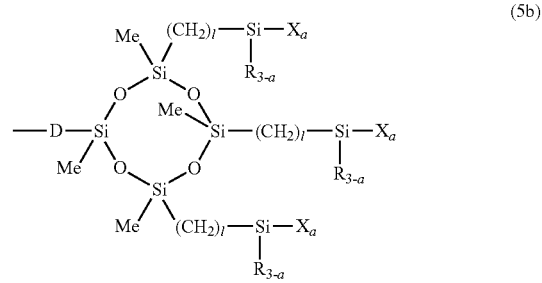  (5b)

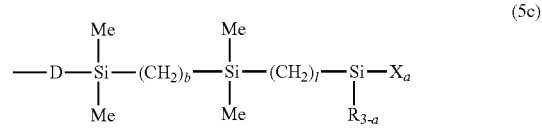  (5c)

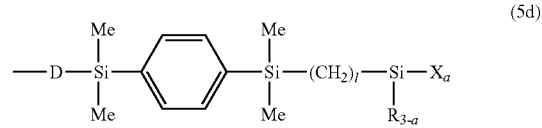  (5d)

Herein R is a $C_1$-$C_4$ alkyl group or phenyl group, X is a hydrolyzable group, a is 2 or 3, l is an integer of 0 to 10, D is a single bond or an optionally fluorinated $C_1$-$C_{20}$ divalent organic group, and b is an integer of 2 to 6.

  (6)

  (7)

Herein Rf, A, and Q are as defined above, β is an integer of 1 to 10, Y is a hydrolyzable group-bearing divalent group having the general formula (5a), and B is hydrogen, $C_1$-$C_4$ alkyl or halogen.

Preferably, Y is a hydrolyzable group-bearing divalent group having the general formula (8), (9) or (10):

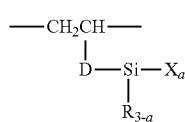
(8)

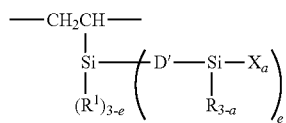
(9)

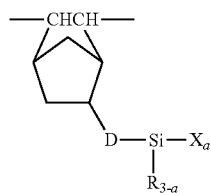
(10)

wherein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, and e is 1 or 2.

In formulae (3), (4), (6) and (7), Rf is —$(CF_2)_d$—$(OCF_2)_p$ $(OCF_2CF_2)_q(OCF_2CF_2CF_2)_r(OCF_2CF_2CF_2CF_2)_s(OCF$ $(CF_3)CF_2)_t$—O—$(CF_2)_d$—. Herein d is independently an integer of 0 to 5, preferably 0 to 2; p, q, r, s and t are each independently an integer of 0 to 200, preferably p is an integer of 5 to 100, q is an integer of 5 to 100, r is an integer of 0 to 100, s is an integer of 0 to 50, t is an integer of 0 to 100, and the sum p+q+r+s+t is an integer of 10 to 200, preferably 20 to 100. Individual units in parentheses may be randomly arranged.

Examples of Rf are shown below.

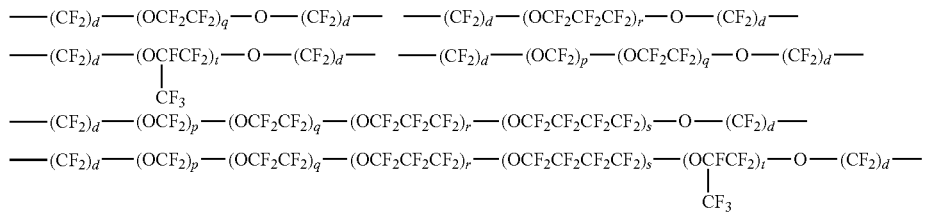

Herein d is as defined above, each of p, q, r, s, and t is an integer of at least 1, with the upper limit being as defined above.

In formulae (3), (4), (6) and (7), Q is a single bond or an optionally fluorinated divalent organic group. Differently stated, Q is a linker between Rf and the terminal group. Preferably Q is a substituted or unsubstituted, divalent organic group of 2 to 12 carbon atoms which may contain one or more structures selected from the class consisting of an amide bond, ether bond, ester bond, methylene bond, ethylene bond, propylene bond, and diorganosilylene group (e.g., dimethylsilylene), more preferably a substituted or unsubstituted, divalent hydrocarbon group of 2 to 12 carbon atoms which may contain the above structure.

Suitable substituted or unsubstituted, divalent hydrocarbon groups of 2 to 12 carbon atoms include alkylene groups such as ethylene, propylene (trimethylene or methylethylene), butylene (tetramethylene or methylpropylene), hexamethylene, and octamethylene, arylene groups such as phenylene, combinations of two or more of the foregoing, such as alkylene-arylene groups, and substituted forms of the foregoing in which some or all hydrogen atoms are substituted by halogen atoms such as fluorine. Inter alia, substituted or unsubstituted $C_2$-$C_4$ alkylene groups and phenylene are preferred.

Examples of Q are shown below.

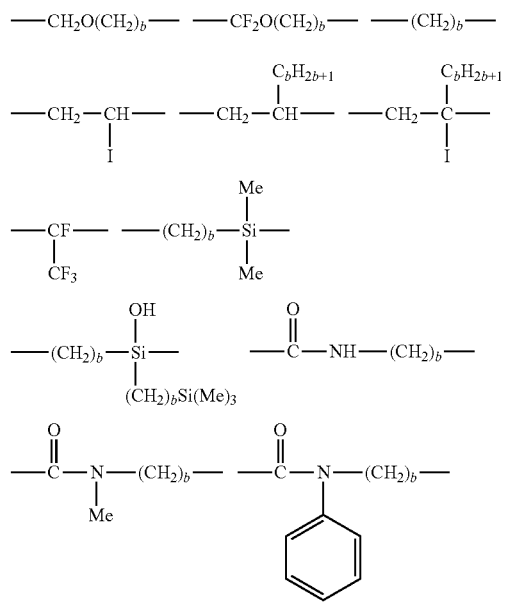

-continued

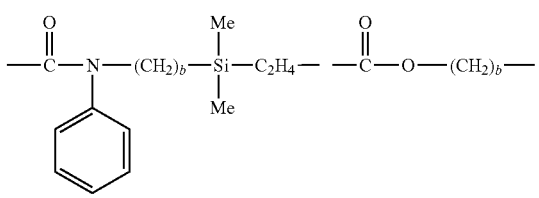

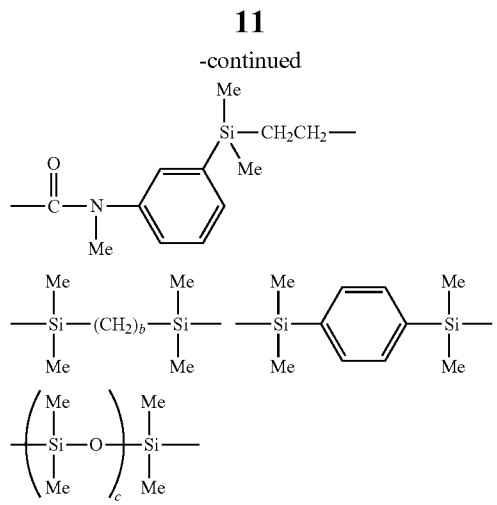

Herein b is an integer of 2 to 4, and c is an integer of 1 to 50.

In formulae (3) and (4), Z is selected from among a single bond, a trivalent group: -JC= (wherein J is an alkyl, preferably $C_1$-$C_3$ alkyl, hydroxyl or silyl ether group: $K_3$SiO— wherein K is independently hydrogen, alkyl, preferably $C_1$-$C_3$ alkyl, aryl, typically phenyl, or alkoxy, preferably $C_1$-$C_3$ alkoxy), a trivalent group: -LSi= (wherein L is alkyl, preferably $C_1$-$C_3$ alkyl), a tetravalent group: —C≡, a tetravalent group: —Si≡, and a di- to octavalent, preferably di- to tetravalent siloxane residue. Where a siloxane bond is contained, a chainlike or cyclic organopolysiloxane residue of 2 to 13 silicon atoms, especially 2 to 5 silicon atoms is preferred. Also a silalkylene structure having two silicon atoms bonded via an alkylene group, that is, Si—$(CH_2)_n$—Si wherein n is an integer of 2 to 6 may be contained. Specifically, the organopolysiloxane residue has a $C_1$-$C_8$, preferably $C_1$-$C_4$ alkyl group such as methyl, ethyl, propyl or butyl, or phenyl group. The alkylene moiety in the silalkylene structure is of 2 to 6 carbon atoms, preferably 2 to 4 carbon atoms.

The group represented by Z is exemplified below.

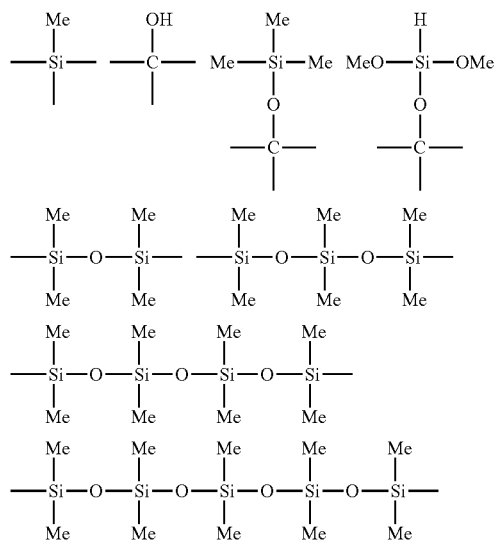

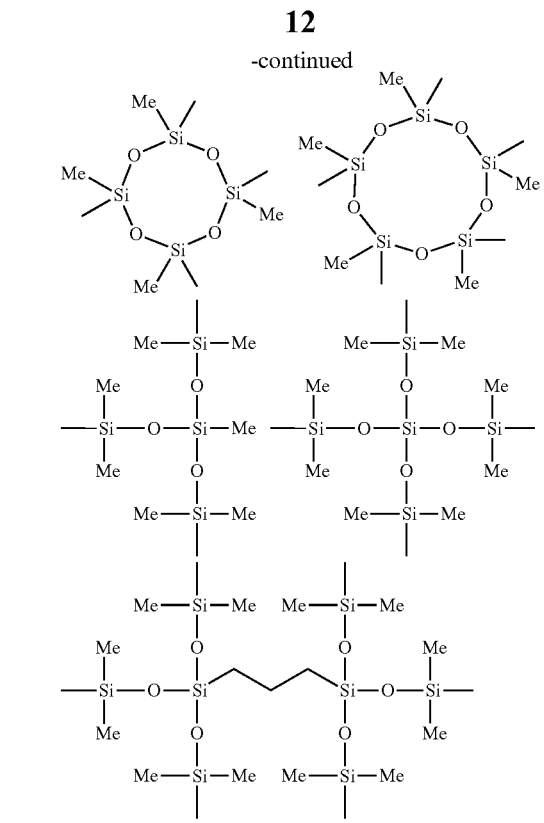

In formulae (3) and (4), W is selected from hydrolyzable group-bearing groups having the general formulas (5a) to (5d).

(5a)

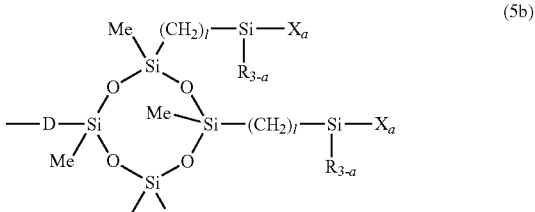

(5b)

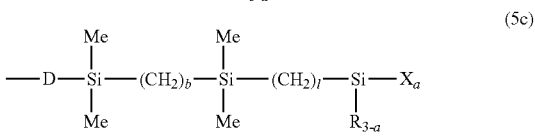

(5c)

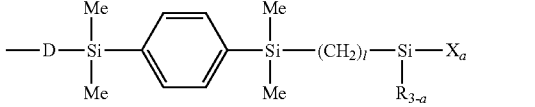

(5d)

Herein R, X and a are as defined above, l is an integer of 0 to 10, preferably 2 to 8, D is a single bond or an optionally fluorinated $C_1$-$C_{20}$ divalent organic group, and b is an integer of 2 to 6.

In formulae (3) and (4), a is an integer of 1 to 7, preferably 1 to 3.

In formulae (6) and (7), Y is a divalent group having a hydrolyzable group X of formula (5a), preferably represented by the general formula (8), (9) or (10).

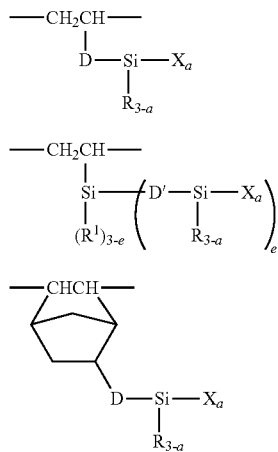

Herein R, X and a are as defined above, D is a single bond or an optionally fluorinated $C_1$-$C_{20}$ divalent organic group, D' is an optionally fluorinated $C_1$-$C_{10}$ divalent organic group, $R^1$ is a $C_1$-$C_{20}$ monovalent hydrocarbon group, and e is 1 or 2.

In formulae (8) to (10), R, X and a are as defined above. D is a single bond or an optionally fluorinated divalent organic group of 1 to 20 carbon atoms, preferably 2 to 8 carbon atoms, specifically divalent hydrocarbon group. D' is an optionally fluorinated divalent organic group of 1 to 10 carbon atoms, preferably 2 to 8 carbon atoms, specifically divalent hydrocarbon group. Suitable divalent hydrocarbon groups represented by D and D' include alkylene groups such as methylene, ethylene, propylene (trimethylene or methylethylene), butylene (tetramethylene or methylpropylene), hexamethylene, and octamethylene, arylene groups such as phenylene, and combinations of two or more of the foregoing, such as alkylene-arylene groups. Preferably, D is ethylene, propylene or phenylene, and D' is ethylene or propylene.

$R^1$ is a $C_1$-$C_{20}$, preferably $C_1$-$C_{10}$ monovalent hydrocarbon group. Examples include alkyl groups such as methyl, ethyl, propyl, isopropyl, butyl, isobutyl, tert-butyl, pentyl, neopentyl, hexyl, and octyl, cycloalkyl groups such as cyclohexyl, alkenyl groups such as vinyl, allyl, and propenyl, aryl groups such as phenyl and tolyl, and aralkyl groups such as benzyl, phenylethyl, and phenylpropyl. Inter alia, methyl is preferred.

Examples of Y are shown below.

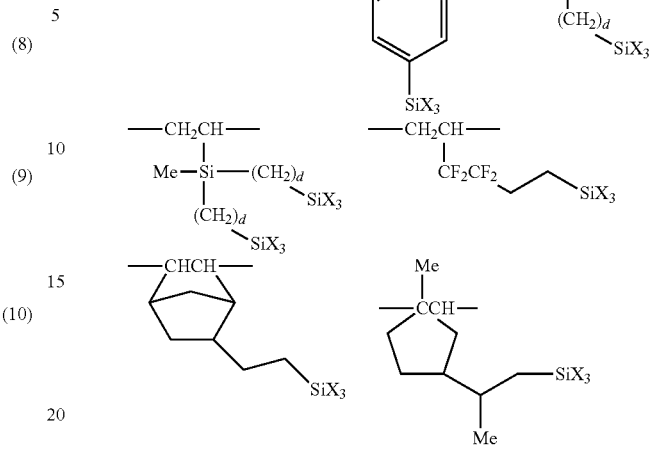

Herein X is as defined above, d is an integer of 2 to 10, and e is an integer of 0 to 10.

Shown below are examples of the fluorooxyalkylene-containing polymer-modified silanes having formulae (3) and (4) wherein the linker Q is —$CH_2$—O—$(CH_2)_3$—, the group Z has the following formula:

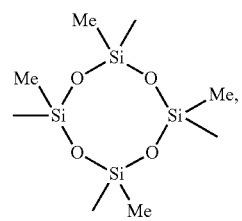

and the group containing hydrolyzable group X, represented by formula (2), has the following formula:

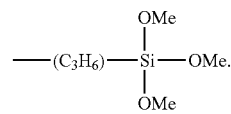

The combination of Q, Z and X is not limited to the above. A series of fluorooxyalkylene-containing polymer-modified silanes are obtained by merely changing Q, Z and X. The desired effect is exerted by any of these fluorooxyalkylene-containing polymer-modified silanes.

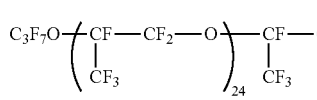 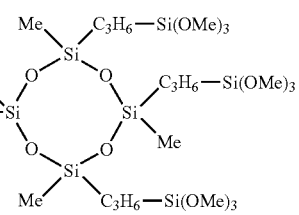

-continued
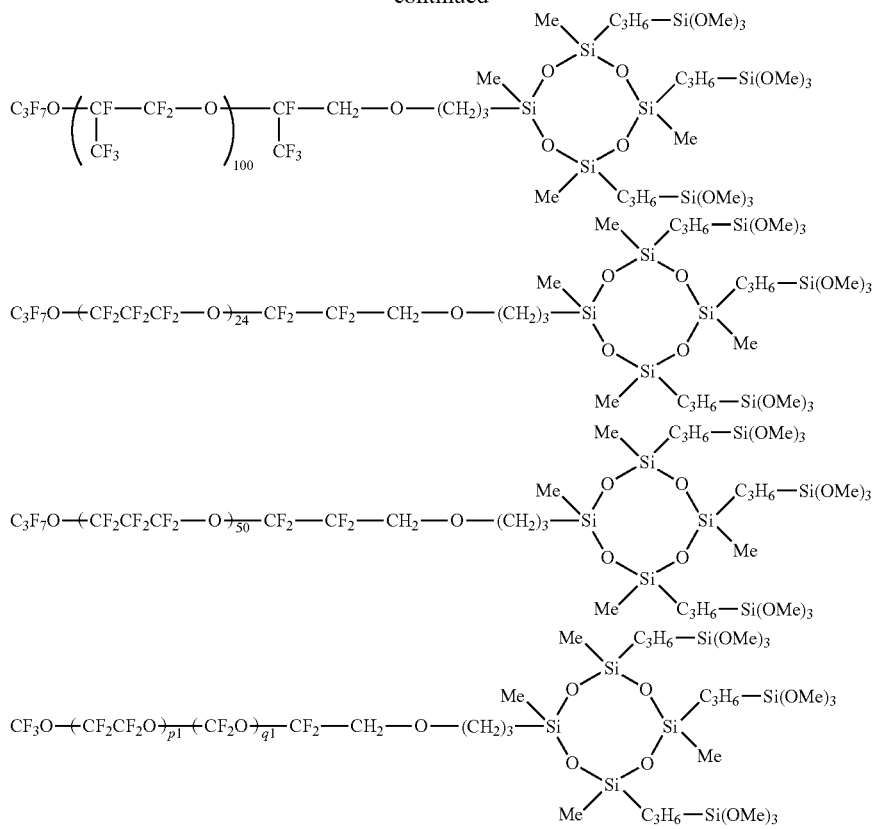
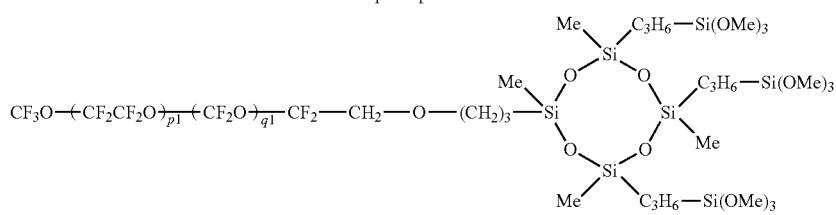
p1 + q1 = 23
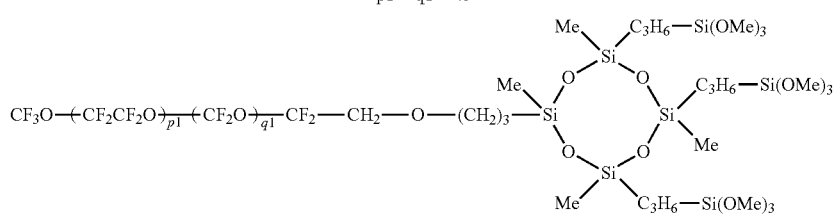
p1 + q1 = 45
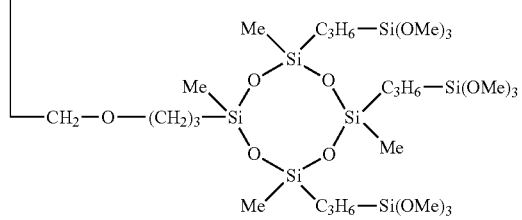
p1 + q1 = 80
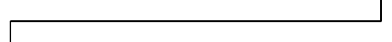
p1 + q1 + r1 + s1 = 80

-continued
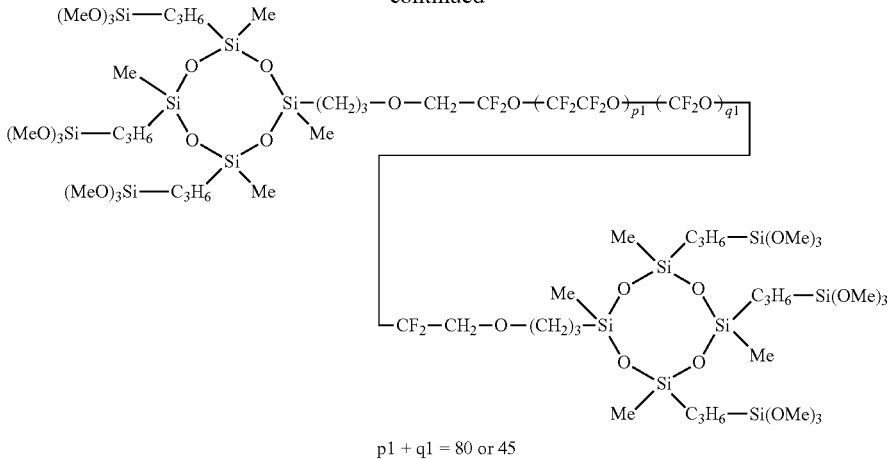
p1 + q1 = 80 or 45
Herein, individual units in parentheses may be randomly arranged.
Further examples of the fluorooxyalkylene-containing polymer-modified silanes having formulae (3) and (4) wherein groups Q and X different from the above-mentioned groups are combined are given by the following structures.
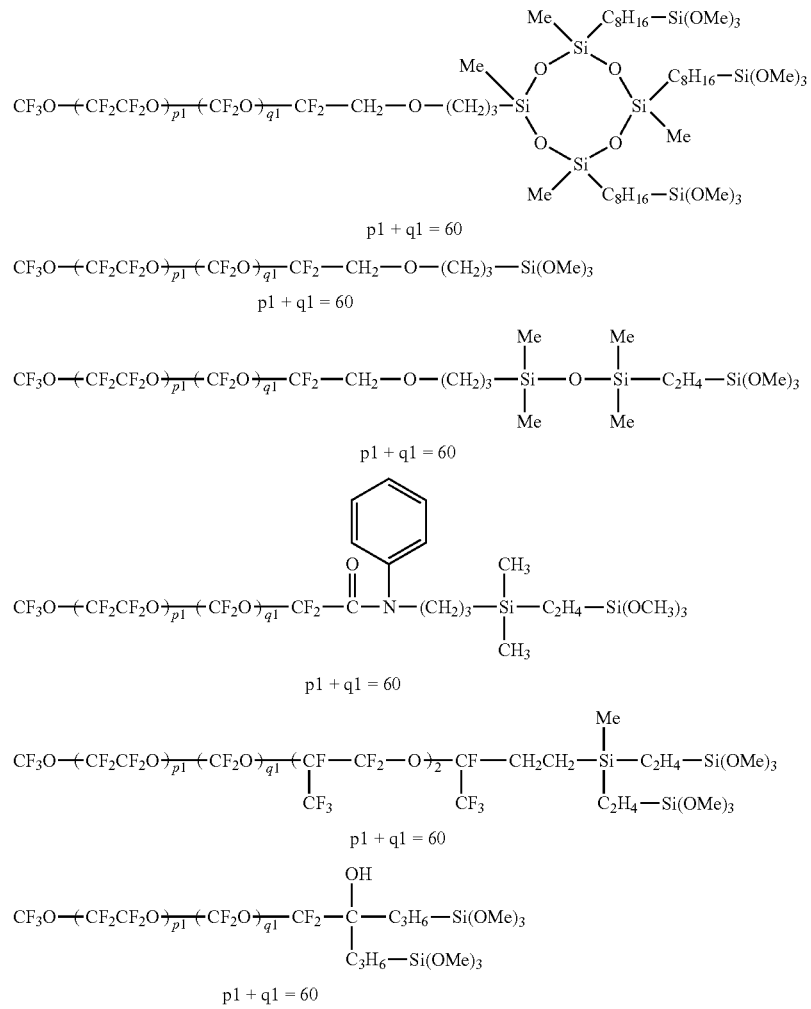

-continued
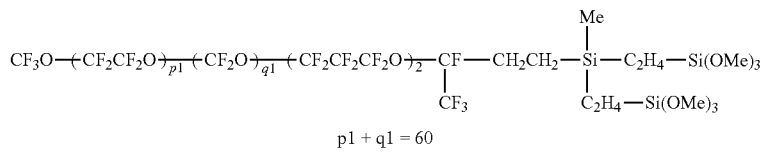
p1 + q1 = 60
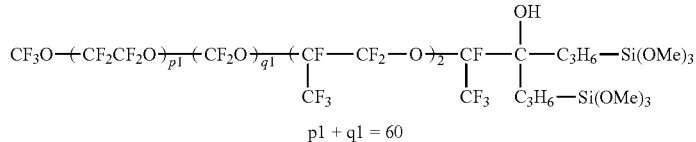
p1 + q1 = 60
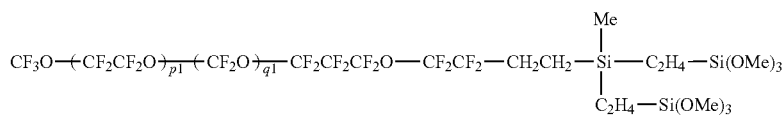
p1 + q1 = 60
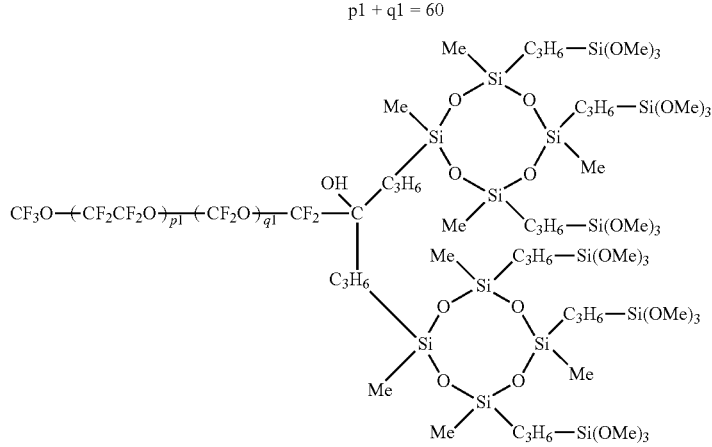
p1 + q1 = 60
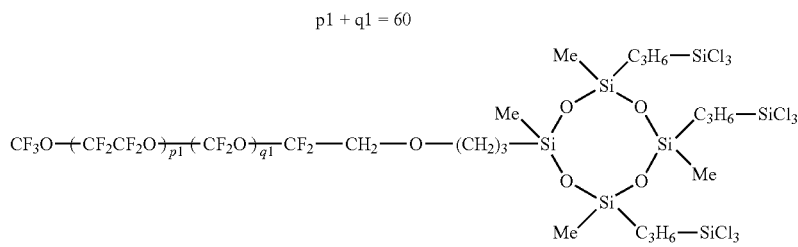
p1 + q1 = 45
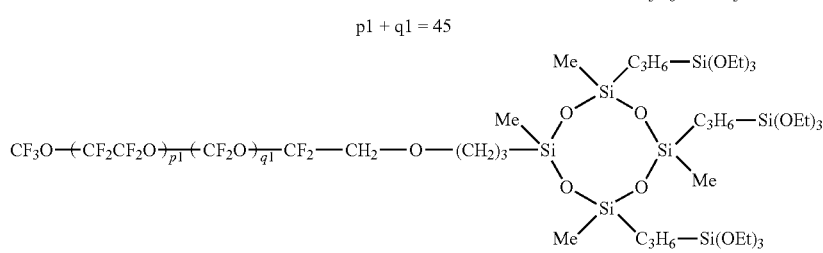
p1 + q1 = 45
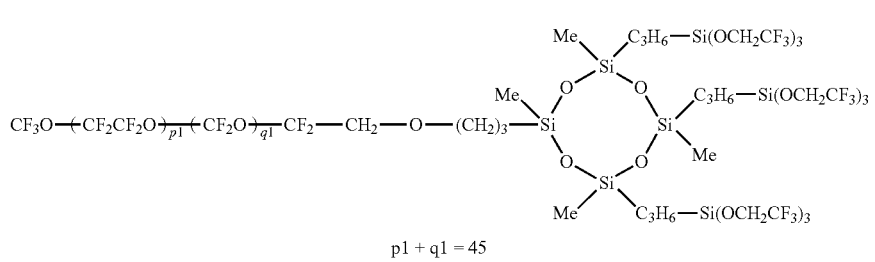
p1 + q1 = 45

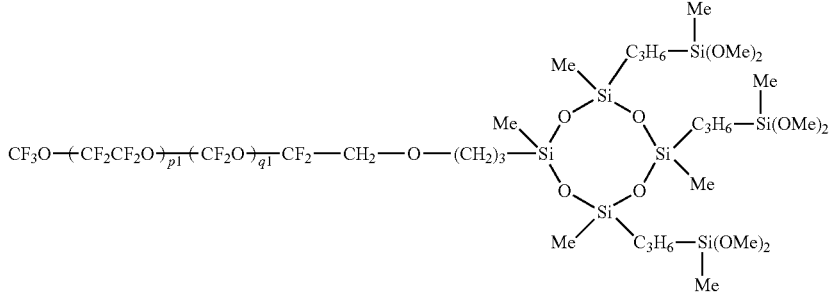
p1 + q1 = 45
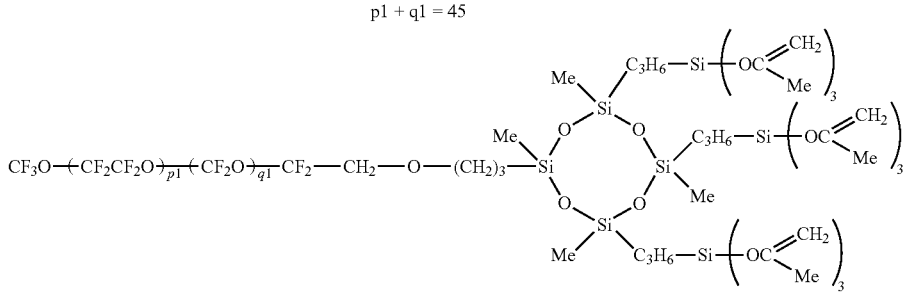
p1 + q1 = 45
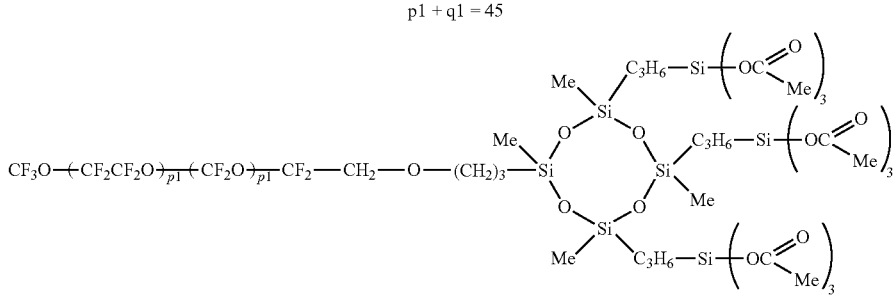
p1 + q1 = 45
Herein, individual units in parentheses may be randomly arranged.
Examples of the fluorooxyalkylene-containing polymer-modified silanes having formulae (6) and (7) are given by the following structures.
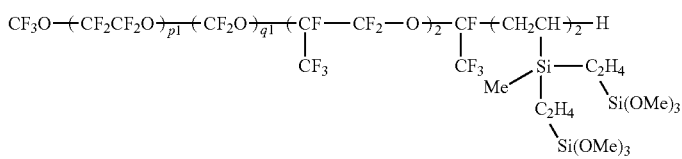
p1 + q1 = 50
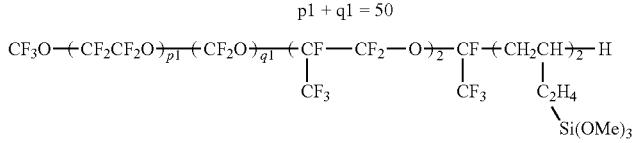
p1 + q1 = 50
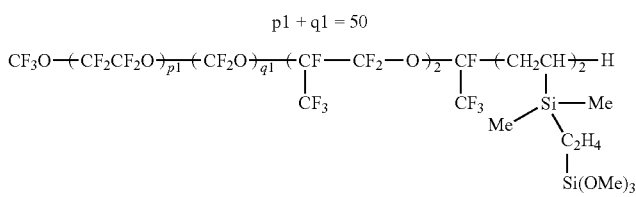
p1 + q1 = 70

-continued
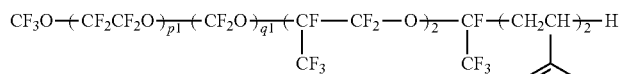
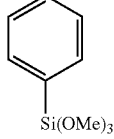
p1 + q1 = 45
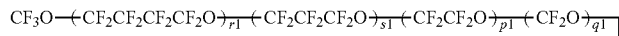
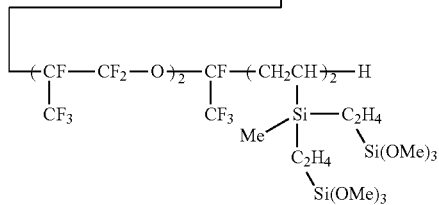
p1 + q1 + r1 + s1 = 80
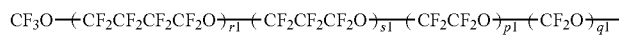
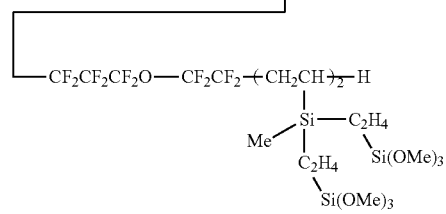
p1 + q1 + r1 + s1 = 80
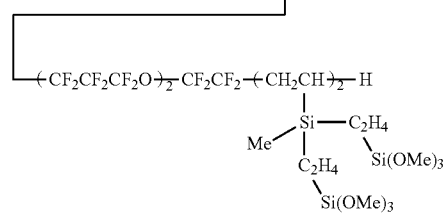
p1 + q1 + r1 + s1 = 80
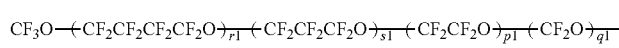
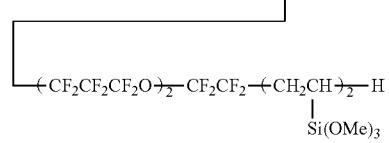
p1 + q1 + r1 + s1 = 80
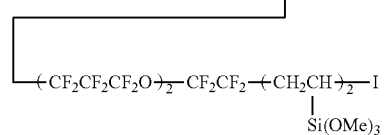
p1 + q1 + r1 + s1 = 80

-continued

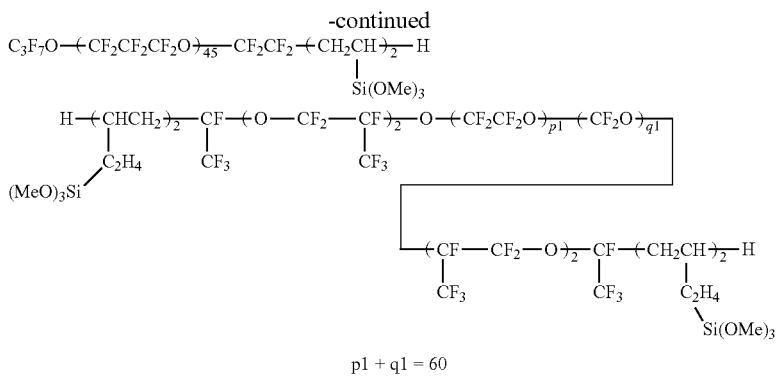

p1 + q1 = 60

Herein, individual units in parentheses may be randomly arranged.

The fluorochemical coating composition may comprise as component (A) a partial hydrolytic condensate obtained by previously subjecting the fluorooxyalkylene-containing polymer-modified silane (specifically its terminal hydrolyzable group) to partial hydrolysis and condensation in a well-known manner.

Notably, component (A) preferably has a weight average molecular weight (Mw) of 1,000 to 20,000, more preferably 2,000 to 10,000. With too low Mw, water/oil repellency and low dynamic friction attributable to the fluorooxyalkylene group may not be fully exerted. With too high Mw, adhesion to substrates may be poor. As used herein, the weight average molecular weight (Mw) is determined by gel permeation chromatography (GPC) versus polystyrene standards under the following conditions.

[Measurement Conditions]
  Developing solvent: hydrochlorofluorocarbon (HCFC-225)
  Flow rate: 1 mL/min.
  Detector: evaporative light scattering detector
  Column: TSKgel Multipore HXL-M (Tosoh Corp.) 7.8 mm ID×30 cm, two columns
  Column temperature: 35° C.
  Sample amount injected: 100 μL (HCFC-225 solution with concentration 0.3 wt %)

In addition to component (A) described above, the fluorochemical coating composition comprises (B) a fluorooxyalkylene-containing polymer. By blending (A) the fluorooxyalkylene-containing polymer-modified silane with (B) the fluorooxyalkylene-containing polymer, the coating is improved in abrasion resistance and feel upon touch to its surface and minimized in haze increase.

Component (B) is a fluorooxyalkylene-containing polymer having the average compositional formula (11).

$$A\text{-}Rf\text{-}A \quad (11)$$

Herein Rf is $-(CF_2)_d-(OCF_2)_p(OCF_2CF_2)_q(OCF_2CF_2CF_2)_r-(OCF_2CF_2CF_2CF_2)_s(OCF(CF_3)CF_2)_t-O-(CF_2)_d-$, d is independently an integer of 0 to 5, p, q, r, s and t are each independently an integer of 0 to 100, p+q+r+s+t is an integer of 5 to 100, individual units in parentheses may be randomly arranged; and A is fluorine, hydrogen, or a monovalent fluorinated group terminated with $-CF_3$, $-CF_2H$ or $-CH_2F$ radical.

The total number of repeating units, i.e., p+q+r+s+t is in a range of 5 to 100, preferably 10 to 80.

In formula (11), "A" is fluorine (F), hydrogen (H), or a monovalent fluorinated group terminated with $-CF_3$, $-CF_2H$ or $-CH_2F$ radical. Suitable monovalent fluorinated groups include $-CF_3$, $-CF_2CF_3$, $-CF_2CF_2CF_3$, $-CF_2H$, and $-CH_2F$.

The fluorooxyalkylene-containing polymer (B) is preferably selected from polymers having the following formulae (12) to (15).

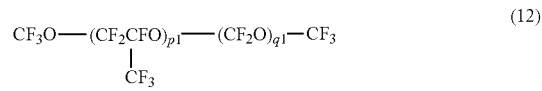  (12)

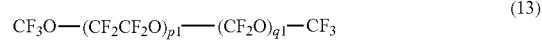  (13)

  (14)

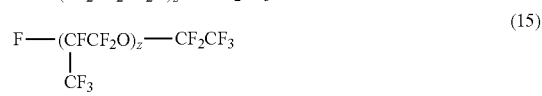  (15)

Herein p1, q1 and z are such numbers that the number of repeating units in the fluorooxyalkylene-containing polymer may be 10 to 100.

Any commercial products may be used as the fluorooxyalkylene-containing polymer or component (B). The polymer is commercially available under the trade name of Fomblin®, Demnum®, and Krytox®, for example. These polymers are described below.

Fomblin Y, typically Fomblin Y25 (Mw: 3,200) and Fomblin Y45 (Mw: 4,100) of the following structure are available from Solvay Solexis.

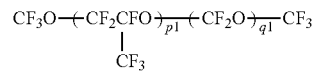

Herein p1 and q1 are such numbers as to meet the specified Mw.

Fomblin Z, typically Fomblin Z03 (Mw: 4,000), Fomblin Z15 (Mw: 8,000), and Fomblin Z25 (Mw: 9,500) of the following structure are available from Solvay Solexis.

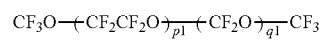

Herein p1 and q1 are such numbers as to meet the specified Mw.

Demnum, typically Demnum S20 (Mw: 2,700), Demnum S65 (Mw: 4,500), and Demnum S100 (Mw: 5,600) of the following structure are available from Daikin Industries, Ltd.

Herein z is such a number as to meet the specified Mw.

Krytox, typically Krytox 143AB (Mw: 3,500), Krytox 143AX (Mw: 4,700), Krytox 143AC (Mw: 5,500), and Krytox 143AD (Mw: 7,000) of the following structure are available from E.I. duPont.

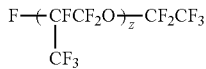

Herein z is such a number as to meet the specified Mw.

The fluorooxyalkylene-containing polymer (B) has a weight average molecular weight (Mw) which is not higher than the Mw of the fluorooxyalkylene-containing polymer-modified silane and/or partial hydrolytic condensate thereof (A) so that component (B) is compatible with component (A). Specifically, the Mw of component (B) is greater than the Mw of component (A) by a factor of 0.25 to 1, preferably 0.25 to 0.9. The upper limit of Mw of component (B) is preferably equal to or less than the Mw of component (A) multiplied by 0.9. More preferably, the Mw of component (B) is greater than the Mw of component (A) by a factor of 0.5 to 1 because of the tendency that higher Mw leads to better sliding. As long as the above requirement is met, the fluorooxyalkylene-containing polymer (B) should preferably have a Mw of 1,000 to 15,000, more preferably 1,500 to 6,000, as determined by GPC versus polystyrene standards using fluorocarbon AK-225 (Asahi Glass Co., Ltd.) as developing solvent.

In the fluorochemical coating composition, (A) the hydrolyzable group-containing silane modified with a fluorooxyalkylene-containing polymer and/or a partial hydrolytic condensate thereof and (B) the fluorooxyalkylene-containing polymer are present in a weight ratio (A)/(B) of 40/60 to 95/5, preferably 70/30 to 85/15.

The fluorochemical coating composition may be diluted with a suitable solvent before it is coated to a substrate. Suitable solvents include fluorine-modified aliphatic hydrocarbon solvents such as pentafluorobutane, perfluorohexane, perfluoroheptane, perfluorooctane, perfluorocyclohexane, and perfluoro-1,3-dimethylcyclohexane; fluorine-modified aromatic hydrocarbon solvents such as m-xylene hexafluoride, benzotrifluoride, and 1,3-trifluoromethylbenzene; fluorine-modified ether solvents such as methyl perfluoropropyl ether, methyl perfluorobutyl ether, ethyl perfluorobutyl ether, and perfluoro(2-butyltetrahydrofuran); fluorine-modified alkylamine solvents such as perfluorotributylamine and perfluorotripentylamine; hydrocarbon solvents such as petroleum benzine, mineral spirits, toluene, and xylene; ketone solvents such as acetone, methyl ethyl ketone, and methyl isobutyl ketone; ether solvents such as tetrahydrofuran and diethyl ether; ester solvents such as ethyl acetate; and alcohol solvents such as isopropyl alcohol. Of these, fluorine-modified solvents are desirable for solubility and wettability, with ethyl perfluorobutyl ether, decafluoropentane, pentafluorobutane, and perfluorohexane being more desirable.

The solvents may be used alone or in admixture of two or more while it is preferred that components (A) and (B) be uniformly dissolved in the solvent. An optimum concentration of components (A) and (B) in the solvent is 0.01 to 50% by weight, especially 0.03 to 20% by weight, though it varies with a particular treating technique.

To the fluorochemical coating composition, other additives may be added, if necessary, as long as the objects of the invention are not impaired. Suitable hydrolytic condensation catalysts include organotin compounds such as dibutyltin dimethoxide and dibutyltin dilaurate, organotitanium compounds such as tetra-n-butyl titanate, organic acids such as fluorinated carboxylic acids, acetic acid, and methanesulfonic acid, and inorganic acids such as hydrochloric acid and sulfuric acid. Of these, fluorinated carboxylic acids, acetic acid, tetra-n-butyl titanate, and dibutyltin dilaurate are preferred. The catalyst may be added in a catalytic amount, typically 0.01 to 5 parts, more preferably 0.1 to 1 part by weight per 100 parts by weight of component (A).

The fluorochemical coating composition may be applied to a substrate by any well-known techniques such as wet coating (e.g., brush coating, dipping, spraying, inkjet coating) and evaporation. Better results are obtained when the coating composition is applied by wet coating techniques. A coating is cured to the substrate. Although the curing temperature varies with a particular coating or curing technique, the curing temperature is typically in a range of room temperature to 200° C. With respect to humidity, humid curing conditions are desirable to accelerate the reaction. The cured coating desirably has a thickness of 0.1 to 100 nm, more desirably 3 to 30 nm although the thickness depends on the type of substrate.

The substrate to be treated with the fluorochemical coating composition is not particularly limited, and may be made of any desired materials including paper, fabric, metals, metal oxides, glass, plastics, ceramics, quartz, and sapphire. The fluorochemical coating composition is effective for endowing the substrate with water/oil repellency, chemical resistance, parting properties, low dynamic friction, and antifouling properties. The substrate may be pretreated on its surface, such as by hard coat treatment or antireflective treatment. If the substrate is less adherent, adhesion may be improved by forming a $SiO_2$ layer or a layer of silane coupling agent having a hydrolyzable group or SiH group as the primer layer or by suitable pretreatment such as vacuum plasma treatment, atmospheric plasma treatment, alkali treatment or acid treatment.

Since the fluorochemical coating composition contains hydrolyzable groups, a silicon oxide ($SiO_2$) layer is formed on the substrate as a primer before the fluorochemical coating composition is coated thereon. If the substrate is of glass or similar material capable of bonding directly with hydrolyzable groups, the $SiO_2$ layer need not be formed. The preferred coating technique is spray coating, inkjet coating or dip coating.

Various articles may be treated with the fluorochemical coating composition. Optical articles are typical, including car navigation systems, car audio players, tablet PCs, mobile phones, smart phones, wearable terminals, digital cameras, digital video cameras, PDA, portable audio players, game consoles, LC displays (for use in operating panels, electronic boards, etc.), organic EL displays, plasma displays, touch panel displays, eyeglass lenses, camera lenses, lens filters, sunglasses, medical instruments (e.g., gastroscopes), copiers, protective film, and antireflective film. Preferred examples of the article treated with the fluorochemical coating composition include touch panels, antireflective coated articles, glass, strengthened glass, sapphire glass, quartz glass, and $SiO_2$-deposited substrates. Since a coating of the fluorochemical coating composition prevents fingerprint or sebum from sticking to the article and imparts flaw resistance, it is best suited as a water/oil repellent layer on touch panel displays.

Example

Examples of the invention are given below by way of illustration and not by way of limitation.

Although components (A) and (B) are separately prepared and mixed together in the following examples, component (A) may also be synthesized by providing starting materials for the synthesis of component (A), adding component (B) to the starting materials, and effecting synthesis. The composition allows for easy comparison of molecular weight between components (A) and (B) since component (B) can be extracted from the composition by letting an adsorbent (such as silica gel) adsorb component (A) or passing the composition through a standard or supercritical chromatograph.

As the silane modified with a fluorooxyalkylene-containing polymer (A), there were furnished Compounds 1 to 3 shown below.

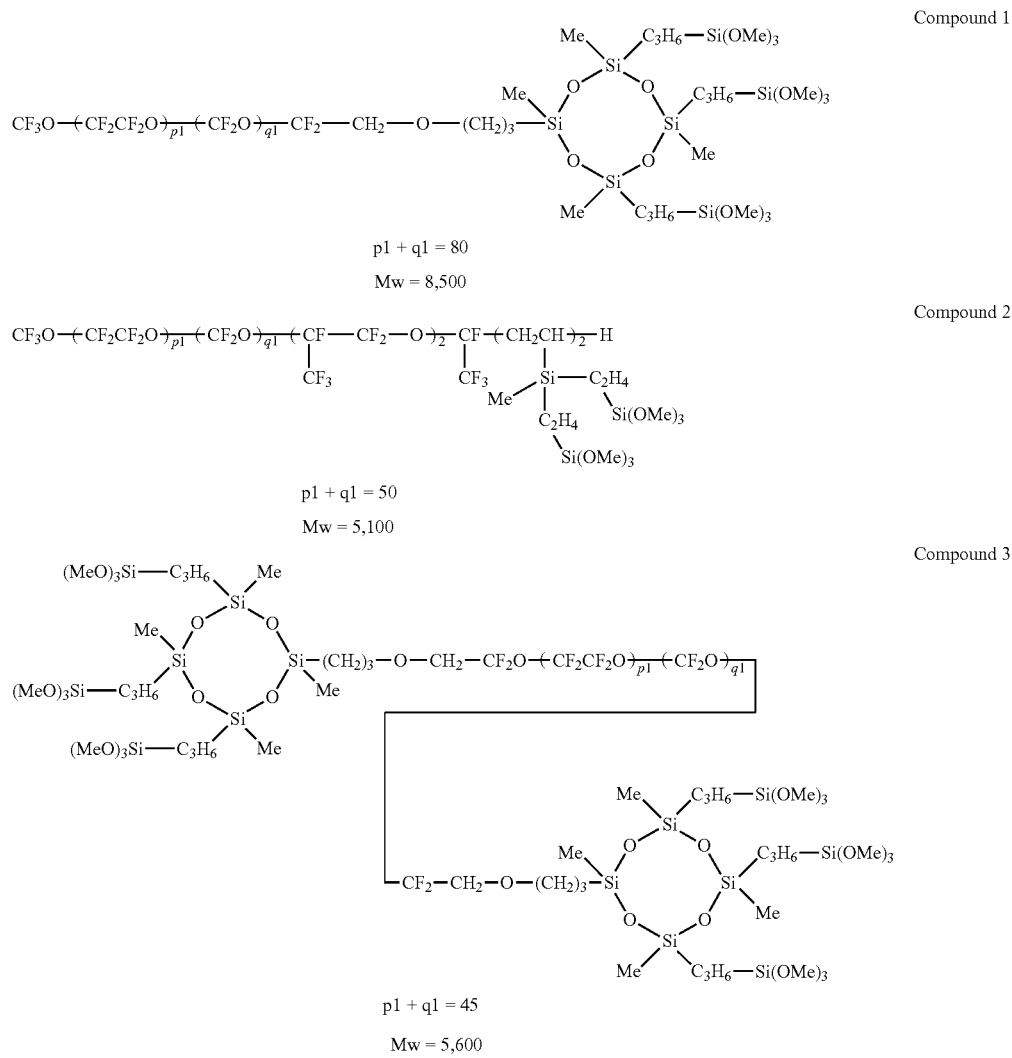

As the fluorooxyalkylene-containing polymer (B), there were furnished Compounds 4 to 6 shown below.

Compound 4: Fomblin Z03 (Solvay Solexis), repeating units ~45, Mw=4,000
Compound 5: Fomblin Z15 (Solvay Solexis), repeating units ~90, Mw=8,000
Compound 6: Fomblin Z60 (Solvay Solexis), repeating units ~90, Mw=13,000

Preparation of Coating Composition and Formation of Cured Film

Coating compositions (or surface treating agents) were prepared by combining components (A) and (B) in the weight ratio shown in Table 1, dissolving them in solvent Novec® 7200 (ethyl perfluorobutyl ether by 3M) in a solid concentration of 0.1 wt %. A glass plate (Gorilla® II by Corning) was cleaned by plasma treatment (Ar 10 cc, $O_2$ 100 cc, power 200 W, time 30 sec.), before the coating composition was spray coated thereto using a spray applicator NST-51 (T&K Co., Ltd.). The coating was cured at 150° C. for 1 hour into a cured film of about 15 nm thick, obtaining a test sample.

TABLE 1

|  |  | Component A | Component B | B/(A + B), wt % |
|---|---|---|---|---|
| Example | 1 | Compound 1 | Compound 4 | 15 |
|  | 2 | Compound 1 | Compound 5 | 15 |
|  | 3 | Compound 2 | Compound 4 | 15 |
|  | 4 | Compound 1 | Compound 5 | 5 |
|  | 5 | Compound 1 | Compound 5 | 30 |
|  | 6 | Compound 1 | Compound 5 | 60 |
|  | 7 | Compound 3 | Compound 4 | 50 |
|  | 8 | 1/1 mixture of Compounds 1 and 2 | Compound 4 | 30 |
| Comparative Example | 1 | Compound 1 | Compound 6 | 15 |
|  | 2 | Compound 2 | Compound 5 | 15 |
|  | 3 | Compound 2 | Compound 6 | 15 |
|  | 4 | Compound 1 | Compound 5 | 70 |
|  | 5 | Compound 1 | Compound 5 | 2 |
|  | 6 | — | Compound 5 | 100 |
|  | 7 | Compound 1 | — | 0 |
|  | 8 | Compound 3 | — | 0 |

The sample (or cured film) was evaluated by the following tests. All the tests were performed at 25° C. and humidity 50%. The results are shown in Table 2.

Water/Oil Repellency

Using a contact angle meter Drop Master (Kyowa Interface Science Co., Ltd.), the cured film was measured for a contact angle with water (droplet: 2 µl) as an index of water repellency.

Haze

Using a haze meter NDH-500 (Nippon Denshoku Co., Ltd.), the sample was measured for haze according to JIS K 7136.

Dynamic Friction

Using a surface property tester 14FW (Shinto Scientific Co., Ltd.), the sample was measured for a coefficient of dynamic friction relative to non-woven fabric Bemcot® (Asahi Kasei Fibers Corp.) over a contact area of 10 mm×35 mm and under a load of 200 g.

Abrasion Resistance

Using an abrasion tester (TriboGear Type 30S by Shinto Scientific Co., Ltd.), the sample was rubbed 5,000 back-and-forth strokes with steel wool #0000 having a contact area of 10 mm×10 mm and under a load of 1 kg. The sample was measured for a contact angle with water again.

TABLE 2

|  |  | Contact angle with water (°) | Haze | Coefficient of dynamic friction | Contact angle with water after abrasion test (°) |
|---|---|---|---|---|---|
| Example | 1 | 113 | 0.29 | 0.03 | 105 |
|  | 2 | 114 | 0.28 | 0.02 | 106 |
|  | 3 | 117 | 0.29 | 0.02 | 110 |
|  | 4 | 112 | 0.30 | 0.03 | 101 |
|  | 5 | 112 | 0.30 | 0.03 | 106 |
|  | 6 | 112 | 0.26 | 0.02 | 101 |
|  | 7 | 110 | 0.30 | 0.04 | 102 |
|  | 8 | 115 | 0.29 | 0.03 | 108 |
| Comparative Example | 1 | 113 | 0.52 | 0.03 | 105 |
|  | 2 | 116 | 0.51 | 0.03 | 108 |
|  | 3 | 115 | 0.65 | 0.03 | 109 |
|  | 4 | 112 | 0.25 | 0.02 | 95 |
|  | 5 | 112 | 0.36 | 0.03 | 96 |
|  | 6 | 101 | 0.25 | 0.03 | 35 |
|  | 7 | 111 | 0.39 | 0.04 | 90 |
|  | 8 | 108 | 0.38 | 0.09 | 75 |

As is evident from the test results, the coating compositions of Comparative Examples 1 to 3 using component (B) having a higher average molecular weight than component (A) showed a remarkable haze increase, adversely affecting the texture inherent to the substrate and visibility. The coating composition of Comparative Example 4 showed no haze increase, but low steel wool abrasion resistance because of a low content of functionalized component in the coating composition. The coating composition of Comparative Example 5 having a less content of component (B) showed some haze increase and unsatisfactory abrasion resistance. The coating composition of Comparative Example 6 free of component (A) lacked abrasion resistance. The coating compositions of Comparative Examples 7 and 8 free of component (B) lacked abrasion resistance.

In contrast, the coating compositions of Examples 1 to 8 consisting of components (A) and (B) in a weight ratio of 40/60 to 95/5 were effective for suppressing any haze increase and showed a low coefficient of dynamic friction and abrasion resistance.

It is demonstrated that the fluorochemical coating composition comprising the fluorooxyalkylene-containing polymer-modified silane and/or a partial hydrolytic condensate thereof, and the fluorooxyalkylene-containing polymer forms a cured film having low dynamic friction and water/oil repellency on a substrate without detracting from the texture and optical properties of the substrate. Therefore, the fluorochemical coating composition is advantageously applicable to touch panel displays, antireflective films and other articles which are expected to be stained with oils and fats and required to maintain visibility. Since haze increase is minimized, post-coating steps such as cleaning and wiping for reducing the haze are unnecessary.

Japanese Patent Application No. 2014-074293 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluorochemical coating composition comprising:
   (A) a hydrolyzable group-containing silane modified with a fluorooxyalkylene-containing polymer and/or a partial hydrolytic condensate thereof, and
   (B) a fluorooxyalkylene-containing polymer having an average molecular weight not higher than the average molecular weight of component (A), in a weight ratio (A)/(B) of 40/60 to 95/5,
   wherein a weight average molecular weight of component (B) is 0.25 to 1 times a weight average molecular weight of component (A),
   wherein the hydrolyzable group-containing silane modified with a fluorooxyalkylene-containing polymer (A) is at least one member selected from fluorooxyalkylene-containing polymer-modified silanes having the general formulae (3), (4), (6) and (7):

   $$A\text{-}Rf\text{-}QZW_\alpha \qquad (3)$$

   $$Rf\text{-}(QZW_\alpha)_2 \qquad (4)$$

wherein Rf is —$(CF_2)_d$—$(OCF_2)_p(OCF_2CF_2)_q$ $(OCF_2CF_2CF_2)_r$—$(OCF_2CF_2CF_2CF_2)_s(OCF(CF_3)$ $CF_2)_t$—O—$(CF_2)_d$—, d is independently an integer of 0 to 5, p, q, r, s and t are each independently an integer of 0 to 200, p+q+r+s+t is an integer of 10 to 200, individual units in parentheses may be randomly arranged, α is an integer of 1 to 7,
A is fluorine, hydrogen, or a monovalent fluorinated group terminated with —CF$_3$, —CF$_2$H or —CH$_2$F radical,
Q is a single bond or an optionally fluorinated divalent organic group,
Z is a single bond, a trivalent group: -JC=(wherein J is an alkyl, hydroxyl or silyl ether group: K$_3$SiO— wherein K is independently hydrogen, alkyl, aryl or alkoxy), a trivalent group: -LSi=(wherein L is alkyl), a tetravalent group: —C≡, a tetravalent group: —Si≡, or a di- to octavalent siloxane residue,
W is a hydrolyzable group-bearing group having the general formula (5b):

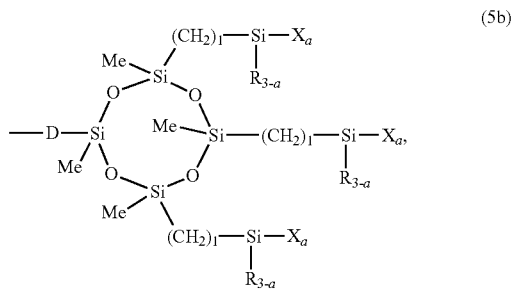
(5b)

wherein R is a C$_1$-C$_4$ alkyl or phenyl, X is a hydrolyzable group, a is 2 or 3, l is an integer of 0 to 10, D is a single bond or an optionally fluorinated C$_1$-C$_{20}$ divalent organic group, b is an integer of 2 to 6, and Me is methyl,

(6)

(7)

wherein Rf, A and Q are as defined above,
β is an integer of 1 to 10,
Y is a hydrolyzable group-bearing divalent group having the general formula (9):

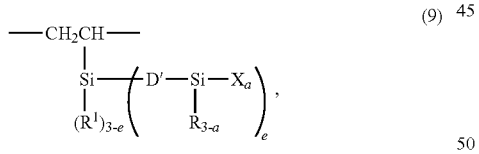
(9)

wherein R, X and a are as defined above, D is a single bond or an optionally fluorinated C$_1$-C$_{20}$ divalent organic group, D' is an optionally fluorinated C$_1$-C$_{10}$ divalent organic group, R$^1$ is a C$_1$-C$_{20}$ monovalent hydrocarbon group, and e is 1 or 2, with the proviso that when β is 1, e is 2 in the general formula (9), and
B is a hydrogen, a C$_1$-C$_4$ alkyl or a halogen.

2. The fluorochemical coating composition of claim 1 wherein component (A) contains 10 to 200 repeating units of the general formula (1):

(1)

wherein g is independently in each unit an integer of 1 to 6, as the fluorooxyalkylene group, and has at least one hydrolyzable silyl group of the general formula (2):

(2)

wherein R is a C$_1$-C$_4$ alkyl or phenyl, X is a hydrolyzable group, and a is 2 or 3, at one or more ends, and component (B) contains 10 to 100 repeating units of the general formula (1) as the fluorooxyalkylene portion.

3. The fluorochemical coating composition of claim 1 wherein component (B) is a polymer having the general formula (11):

wherein Rf is —(CF$_2$)$_d$—(OCF$_2$)$_p$(OCF$_2$CF$_2$)$_q$ OCF$_2$CF$_2$CF$_2$)$_r$—(OCF$_2$CF$_2$CF$_2$CF$_2$)$_s$(OCF(CF$_3$) CF$_2$)$_t$—O—(CF$_2$)$_d$—, d is independently an integer of 0 to 5, p, q, r, s and t are each independently an integer of 0 to 100, p+q+r+s+t is an integer of 5 to 100, individual units in parentheses may be randomly arranged, and
A is fluorine, hydrogen, or a monovalent fluorinated group terminated with —CF$_3$, —CF$_2$H or —CH$_2$F radical.

4. The fluorochemical coating composition of claim 1 wherein Q is a single bond or a group selected from divalent groups having the following formulae:

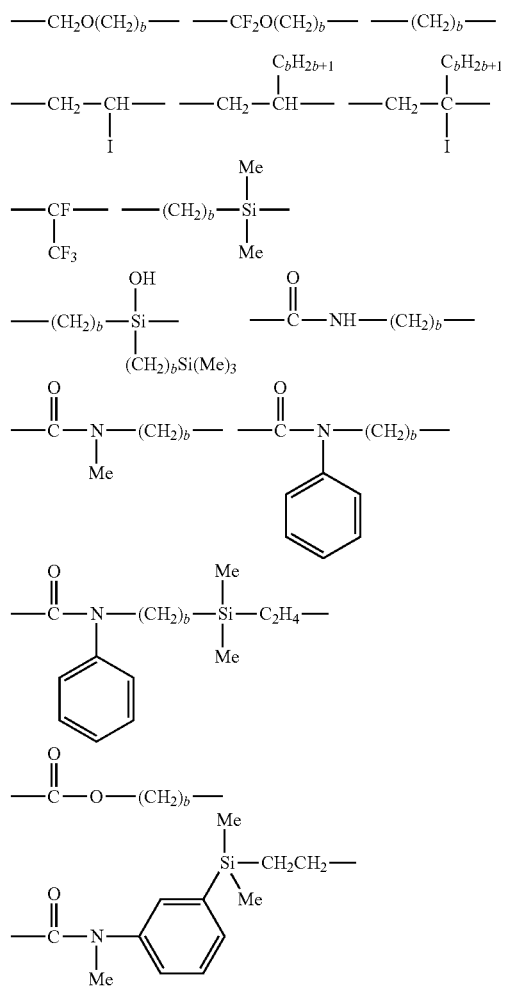

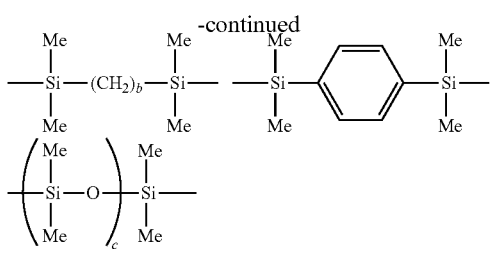

wherein b is an integer of 2 to 6, c is an integer of 1 to 50, and Me is methyl.

5. The fluorochemical coating composition of claim 1 wherein Z is a single bond or a group selected from divalent to octavalent groups having the following formulae:

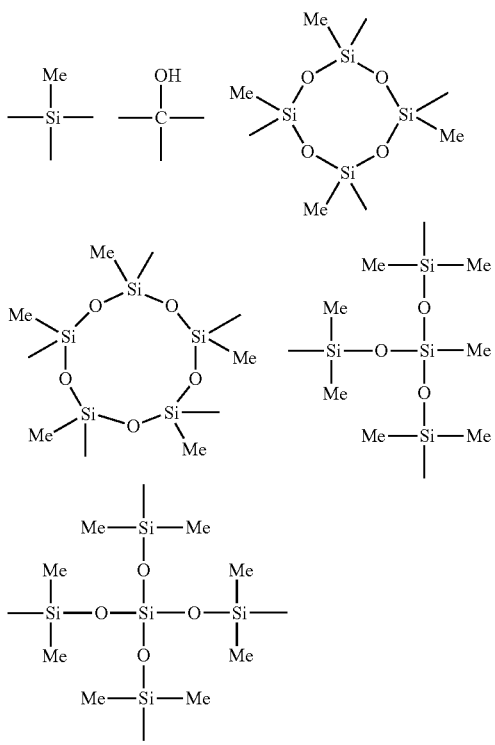

wherein Me is methyl.

6. The fluorochemical coating composition of claim 1, further comprising a solvent for dilution.

7. The fluorochemical coating composition of claim 6 wherein the solvent is ethyl perfluorobutyl ether, decafluoropentane, pentafluorobutane or perfluorohexane.

8. The fluorochemical coating composition of claim 1, wherein the hydrolyzable group-containing silane modified with a fluorooxyalkylene-containing polymer (A) comprises a fluorooxyalkylene-containing polymer-modified silane having the formula (3).

9. The fluorochemical coating composition of claim 1, wherein the hydrolyzable group-containing silane modified with a fluorooxyalkylene-containing polymer (A) comprises a fluorooxyalkylene-containing polymer-modified silane having the formula (4).

10. The fluorochemical coating composition of claim 1, wherein the hydrolyzable group-containing silane modified with a fluorooxyalkylene-containing polymer (A) comprises a fluorooxyalkylene-containing polymer-modified silane having the formula (6).

11. The fluorochemical coating composition of claim 1, wherein the hydrolyzable group-containing silane modified with a fluorooxyalkylene-containing polymer (A) comprises a fluorooxyalkylene-containing polymer-modified silane having the formula (7).

12. An article treated with the fluorochemical coating composition of claim 1.

13. A touch panel treated with the fluorochemical coating composition of claim 1.

14. An antireflective coated article treated with the fluorochemical coating composition of claim 1.

15. A glass, strengthened glass, sapphire glass, quartz glass or $SiO_2$-deposited substrate treated with the fluorochemical coating composition of claim 1.

* * * * *